Patented Oct. 26, 1954

2,692,844

UNITED STATES PATENT OFFICE 2,692,844

SHATTERPROOF ORGANO - SILOXANE BONDED LAMINATE AND ADHESIVE USED THEREFOR

James F. Hyde, Midland, Mich., assignor to Dow Corning Corporation, Midland, Mich., a corporation of Michigan No Drawing. Application October 29, 1952, Serial No. 317,591

9 Claims. (Cl. 154—139)

This invention relates to a novel method of curing completely condensed organosiloxanes and to the compositions employed in the method.

The terms "curing" and "thermosetting" as employed herein mean that a normally soluble thermoplastic organopolysiloxane is rendered insoluble and infusible. The term "completely condensed" as employed herein means that the organosiloxanes contain no detectable amount of silicon bonded hydroxyl groups as determined by such methods as the Zerewitinoff or infrared methods. The term "acid free" as employed herein means that the organopolysiloxanes contain no silicon bonded acid groups such as ≡SiAc where Ac is, for example, —OSO$_3$H or —OPO$_3$H$_2$.

In the past, completely condensed organopolysiloxanes have been cured by one of two methods. Either the organic groups were removed by oxidation or hydrolytic fission from the silicon atoms to produce a resulting SiOSi cross-link, or the diorganopolysiloxanes were copolymerized with monoorganosiloxanes by the action of catalysts such as alkali metal hydroxides. Whereas the above methods are suitable for many applications, there are other applications in which these methods are not applicable. One reason is that past methods for curing completely condensed siloxanes require elevated temperatures, for example, 24 hours at 250° C. This precludes curing in the presence of organic materials. Another disadvantage of past methods is bubbling. There are many potential applications for the use of organosilicon compounds where it is desirable to cure the material at a relatively low temperature (i. e. below 100° C.) and at the same time to avoid bubbling. The applicant has found that these objectives may be accomplished in an expeditious manner by employing the method of this invention.

The objects of this invention are to provide a novel method for curing completely condensed organosiloxanes; to provide a method of producing shatter-proof organosiloxane bonded laminates; to provide a method of producing safety glass; and to provide a novel method for curing organopolysiloxane rubbers.

This invention relates to a heat-curable organopolysiloxane comprising a toluene-soluble, acid-free, completely-condensed organopolysiloxane having from 1.9 to 2.05 organic radicals per silicon atom, said radicals being of the group monovalent hydrocarbon radicals and halogen derivatives thereof and from .1 to 5 per cent by weight, based on the organosiloxane, of an essentially non-volatile toluene-soluble alkoxy polysilicate wherein the alkoxy groups have less than 9 carbon atoms.

The above composition of matter may be cured by heating a mixture of the organosiloxane and the polysilicate at an elevated temperature until the organosiloxane has been rendered insoluble and infusible. The mechanism for this reaction is not known. In general, the temperatures employed range from 75° C. to 300° C. and the length of time required is inversely proportional to the temperature. If desired, curing catalysts may be employed in order to hasten the rate of cure or to lower the temperature of cure. However, these catalysts are not essential to the operativeness of this invention. Suitable catalysts include alkali metal hydroxides, salts, alkali metal salts of organosiloxanes and the like.

The organopolysiloxanes employed in this invention are primarily diorganosiloxanes, although there may be present limited amounts of monoorganosiloxanes and triorganosiloxanes so proportioned that there is an average of from 1.9 to 2.05 monovalent hydrocarbon radicals per silicon atom. This invention includes within its scope, any monovalent hydrocarbon substituted organopolysiloxane. Thus, the hydrocarbon radicals are saturated and unsaturated aliphatic radicals, saturated and unsaturated cycloaliphatic radicals and aryl radicals. Specific examples of such siloxanes are those in which the organic groups are ethyl, methyl, octadecyl, phenyl, tolyl, xenyl, vinyl, allyl, ethinyl, cyclohexenyl and cyclohexyl. Also included within the scope of this invention are halogen derivatives of monovalent hydrocarbon radicals such as chlorophenyl, bromoxenyl, trifluoromethylphenyl, chloromethyl, alpha-chlorovinyl, and chlorocyclohexyl radicals. It is to be understood that any combination of the above radicals may be present in the siloxane.

The physical state of the completely condensed organosiloxanes employed in this invention ranges from thin fluids (i. e. viscosities of the order of 2 cs. at 25° C.) to non-flowing solids. Siloxanes of this type may be prepared by any of the well known methods for preparing completely condensed organosiloxanes.

The alkoxypolysilicates employed herein are polymeric materials wherein the silicon atoms are linked through oxygen atoms and wherein some of the silicon atoms have alkoxy groups attached thereto. For the purpose of this invention, these polysilicates are essentially non-volatile, i. e. they do not give off any appreciable volatiles when heated at 250° C. at atmospheric pressure. The silicates may be prepared by partially hydrolyzing the corresponding compounds of the formula Si(OR)₄ or mixtures thereof and thereafter removing the volatiles by heating preferably at reduced pressure. The hydrolysis must not have proceeded to the point where the product is insoluble in organic solvents such as toluene.

It is essential for the purpose of this invention that the silicate employed be a polysilicate since such compounds as ethylorthosilicate or methyltriethoxysilane do not cause curing of completely condensed organosiloxanes when employed in the process of this invention.

Any non-volatile alkoxysilicate, wherein the alkyl groups contain less than 9 carbon atoms, is operative in this invention. Specific examples of such radicals are methyl, ethyl, propyl, isopropyl, butyl, amyl, and octyl radicals.

The organopolysiloxane and the polysilicate may be mixed in any suitable fashion. In some instances, it may be desirable to mill the two, although better dispersion is obtained by employing a mutual solvent. Suitable solvents include aromatic hydrocarbons such as toluene, benzene and xylene and ethers such as diethyl-ether. If a solvent is employed, devolatilization should be accomplished before curing is effected. This will prevent excessive bubbling during curing.

The process of this invention is particularly adapted for the production of shatter-proof laminates such as safety glass. Sheets of plastic materials may be coated with a solution of the composition of this invention and thereafter the coating is devolatilized. Additional sheets of the plastic material may then be laminated to build up a laminate containing alternate layers of the plastic sheet material and the polysiloxane. The laminate is then heated at a temperature of from 75° C. to 300° C. until the siloxane is cured. The resulting laminate is clear and bubble free. In order to prevent bubbling during cure, the completely condensed organopolysiloxane used to make these laminates should have a viscosity of at least 1,000 cs. at 25° C.

Such laminates are particularly adaptable for use in applications which require high or low temperatures. Furthermore, they are adaptable for use in conjunction with either inorganic plastics such as glass or with organic plastics.

Another outstanding use for the method and materials of this invention is in the preparation of organopolysiloxane rubbers. In the past, silicone rubbers have been cured primarily by the use of organic peroxides. Whereas this method has many advantages and has proved to be commercially successful, it nevertheless suffers from certain inherent difficulties due to the action of the peroxide or its decomposition products on the cured rubbers. This detrimental action is avoided by employing the procedure of this invention.

Specifically, the organopolysiloxane may be milled with a filler and with the polysilicate and thereafter molded into the desired shape and then cured by heat. This method is particularly advantageous for use with organic fillers which interfere with the curing action of organic peroxides.

Suitable fillers which may be employed in the process of this invention include inorganic materials such as silica aerogels, fume silicas, diatomaceous earth, carbon black, titania, and organic fillers such as cork, wood flour and cotton linters.

In employing the method of this invention in the fabrication of rubbers, it is immaterial what the order of addition of the ingredients is. That is, if desired, the organopolysiloxane and the polysilicate may be mixed prior to addition of the filler or the polysilicate may be added after addition of the filler or the three ingredients may be milled simultaneously. The amount of filler employed will vary with the final properties desired in the cured elastomer and with the type filler employed. In general, fillers are employed in amount from 10 to 300 parts by weight per 100 parts organopolysiloxane. When the so-called "reinforcing silicas" such as silica aerogels and fume silicas are used, the preferred amount is from 10 to 50 parts filler per 100 parts by weight organopolysiloxane. If desired, these reinforcing fillers may be treated with organochlorosilanes or organoaminosilanes such as trimethylchlorosilane or hexamethyldisilazane.

It is to be understood that the heat-curable elastomers contain as their essential ingredients the organopolysiloxane, the alkoxypolysilicate and a filler. However, they may also contain minor amounts of other additives in order to improve specific properties of the elastomer. For example, the products may contain low compression set additives such as zinc oxide, mercuric oxide and cadmium oxide; oxidation inhibitors and pigments.

After compounding and molding are complete, the material is then heated at a temperature above 75° C. until the desired state of cure is obtained.

The following examples are illustrative only and are not to be construed as limiting the invention which is properly delineated in the appended claims.

*Example 1*

10 g. of a non-flowing, acid-free, completely-condensed dimethylpolysiloxane was dissolved in 100 cc. of toluene and mixed with .2 g. of a non-volatile ethylpolysilicate. The solution was applied to a glass sheet and the solvent evaporated at 75° C., leaving a coating of the mixed siloxanes on the glass. The operation was repeated until a coating of two to three mm. thickness was built up. A second sheet of glass was placed thereon, care being taken to avoid trapping air. The laminate was cured at 250° C. for 2 hours whereupon the siloxane had set to a non-flowing resilient material. The clear laminate was struck with a hammer whereupon the glass on one side, only, cracked but no glass particles flew off.

*Example 2*

10 g. of an acid-free, completely-condensed copolymer of dimethylsiloxane and trimethylsiloxane having a viscosity of 1685 cs. at 25° C. was mixed with .2 g. of a non-volatile, liquid ethylpolysilicate. The composition was heated for 3 hours at 200° C. and then for 2 hours at 250° C. The organosiloxane set to a solid, resilient mass.

*Example 3*

10 g. of a slightly tacky acid-free, completely-condensed, phenylmethylpolysiloxane was mixed with .2 g. of a non-volatile ethylpolysilicate, .2 g. of dimethylformamide and 100 cc. of toluene and the solution was evaporated on a glass sheet at 75° C. Another glass sheet was applied to the siloxane coating and the laminate cured 2 hours at 250° C. The resulting laminate was then dropped six feet onto a concrete floor. The side striking the floor cracked but the opposite sheet of glass did not crack. No particles of glass flew off when the laminate struck the floor.

*Example 4*

10 g. of a completely-condensed, non-flowing dimethylpolysiloxane (having a trace of potassium hydroxide therein) was mixed with .2 g. of a non-volatile ethylpolysilicate, .2 g. of dimethyl formamide and 100 cc. of toluene. The solvent was removed and the resulting mixture heated overnight at 75° C. whereupon it set to a resilient gel.

*Example 5*

Equivalent results are obtained when essentially non-volatile, toluene-soluble methoxy or octyloxy polysilicates are employed to cure the dimethylpolysiloxane of Example 1 in the manner of that example.

*Example 6*

100 parts by weight of a completely-condensed, acid-free, toluene-soluble, solid dimethylpolysiloxane and 40 parts by weight of a silica aerogel known as "Santocel C," which had been saturated with trimethylchlorosilane, were milled to give a uniform mix. The compounded polymer was divided into two portions. One portion was milled with 3 parts by weight, based on the weight of the siloxane, of a non-volatile liquid ethylpolysilicate having a viscosity of 11 cs. at 25° C. No polysilicate was added to the second portion.

The two portions were each heated 30 minutes at 150° C. and 1 hour at 250° C. The portion containing the silicate had cured to give a siloxane rubber while the portion not containing the silicate was a tacky, plastic mass which showed no evidence of curing.

*Example 7*

Curing is obtained when the completely condensed, toluene-soluble, acid-free organopolysiloxanes shown below are mixed with a liquid methoxy polysilicate in the amount of 10 g. of siloxane to .1 g. of silicate and heated 4 hours at 250° C.

A copolymer of 90 mol per cent dimethylsiloxane and 10 mol per cent

Diphenylsiloxane
Vinyltolysiloxane
Ethylcyclohexylsiloxane
Trifluormethylphenyl methyl siloxane
Dichlorophenyl methyl siloxane
Octadecylmethylsiloxane
Alpha-chlorovinyl methyl siloxane That which is claimed is:

1. A method of curing a completely-condensed, acid-free, toluene-soluble organopolysiloxane having from 1.9 to 2.05 organic radicals per silicon atom, said radicals being selected from the group consisting of monovalent hydrocarbon radicals and halogen derivatives thereof, which comprises heating the polysiloxane with from .1 to 5 per cent by weight based on the siloxane of an essentially non-volatile, toluene-soluble alkoxypolysilicate wherein the alkoxy radicals contain less than 9 carbon atoms, at an elevated temperature until the mass is rendered insoluble and infusible.

2. A composition of matter consisting essentially of a toluene-soluble, acid-free, completely-condensed organopolysiloxane having from 1.9 to 2.05 organic radicals per silicon atom, said radicals being of the group consisting of monovalent hydrocarbon radicals and halogen derivatives thereof, and from .1 to 5 per cent by weight based on the polysiloxane of an essentially non-volatile, toluene - soluble, alkoxypolysilicate wherein the alkoxy groups contain less than 9 carbon atoms.

3. A composition in accordance with claim 2 wherein the organopolysiloxane is a methylpolysiloxane.

4. A composition in accordance with claim 2 in which the organopolysiloxane is a methylphenylpolysiloxane.

5. A method of preparing a shatter-proof laminate from plastic sheet materials which comprises applying a mixture of (1) a toluene-soluble, acid-free, completely-condensed organopolysiloxane having a viscosity of at least 1,000 cs. at 25° C. and having from 1.9 to 2.05 organic radicals per silicon atom, said radicals being of the group consisting of monovalent hydrocarbon radicals and halogen derivatives thereof, and (2) from .1 to 5 per cent by weight based on the polysiloxane of an essentially non-volatile toluene-soluble alkoxy polysilicate in which the alkoxy groups contain less than 9 carbon atoms, to said sheet material, devolatilizing the mixture, laminating the sheet materials so as to produce alternate layers of the mixed siloxanes and sheet material and thereafter curing the laminate until the siloxane has become infusible and bonds the layers of sheet material into a unitary structure.

6. A heat curable composition of matter consisting essentially of (1) a toluene-soluble, completely-condensed, acid-free organopolysiloxane having from 1.9 to 2.05 organic radicals per silicon atom, said radicals being of the group consisting of monovalent hydrocarbon radicals and halogenated derivatives thereof, (2) from .1 to 5 per cent by weight, based on the weight of the siloxane, of a substantially non-volatile, toluene-soluble alkoxypolysilicate wherein the alkoxy radicals contain less than 9 carbon atoms and (3) a filler.

7. A composition in accordance with claim 6 wherein the organopolysiloxane is a methylpolysiloxane.

8. A composition in accordance with claim 6 wherein the organopolysiloxane is a methylphenylpolysiloxane.

9. A shatterproof laminate composed of alternate layers of plastic sheets and a cured organopolysiloxane composed of (1) a toluene-soluble, acid-free, completely condensed organopolysiloxane having a viscosity of at least 1,000 cs. at 25° C. and having from 1.9 to 2.05 organic radicals per silicon atom, said radicals being of the group consisting of monovalent hydrocarbon radicals and halogen derivatives thereof, and (2) from .1 to 5 per cent by weight based on the polysiloxane of an essentially non-volatile, toluene-soluble, alkoxy polysilicate in which the alkoxy groups contain less than 9 carbon atoms.

References Cited in the file of this patent

UNITED STATES PATENTS

| Number | Name | Date |
|---|---|---|
| 2,397,727 | Daudt | Apr. 2, 1946 |
| 2,492,498 | Pedersen | Dec. 27, 1949 |
| 2,559,791 | Peyrot et al. | July 10, 1951 |
| 2,562,953 | Rust | Aug. 7, 1951 |
| 2,571,039 | Hyde | Oct. 9, 1951 |